July 18, 1967
G. D. PRENTICE
3,331,640
SILO UNLOADER
Filed Nov. 29, 1965
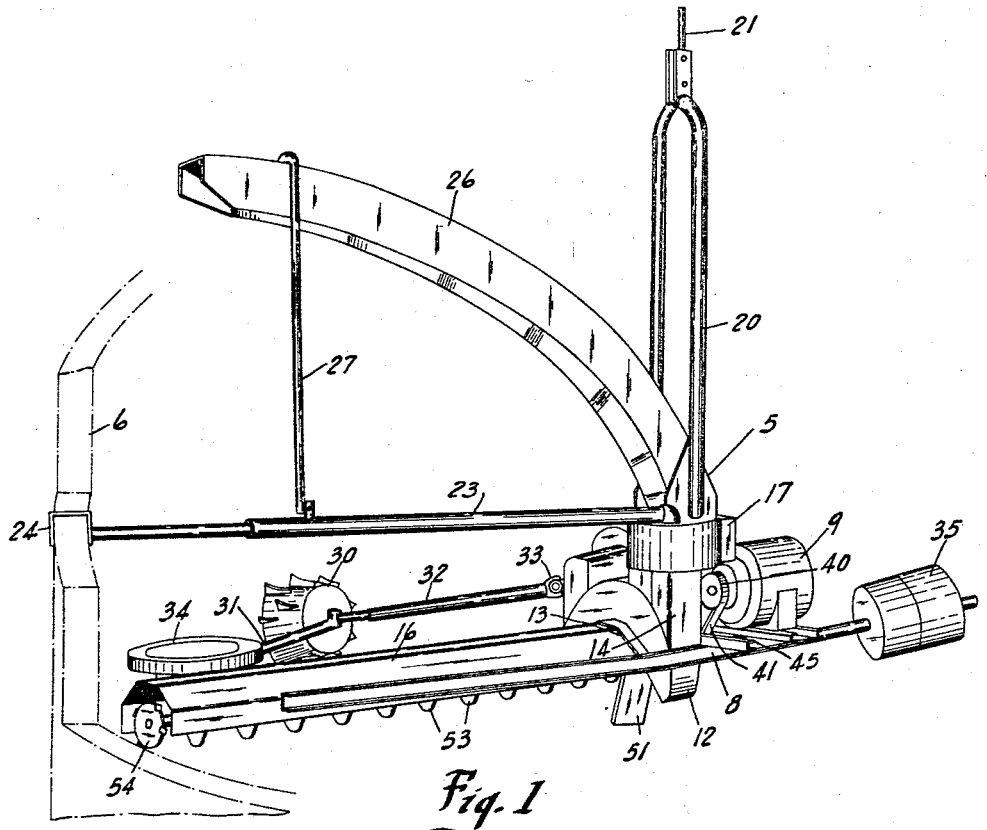
Fig. 1
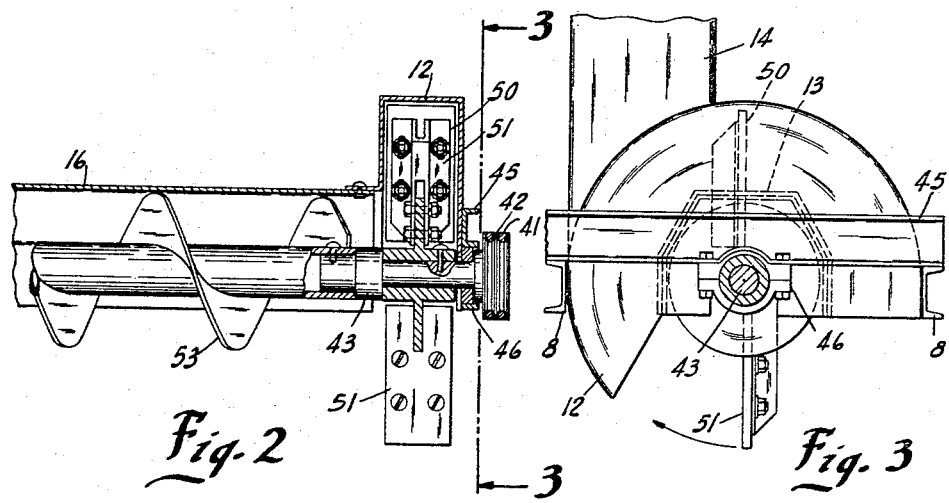
Fig. 2
Fig. 3
INVENTOR.
GEORGE D. PRENTICE
BY
Lieber & Niller
ATTORNEY

United States Patent Office 3,331,640
Patented July 18, 1967

3,331,640
SILO UNLOADER
George D. Prentice, Milwaukee, Wis., assignor to A. F. Klinzing Co., Inc., Milwaukee, Wis., a corporation of Wisconsin
Filed Nov. 29, 1965, Ser. No. 510,346
2 Claims. (Cl. 302—56)

ABSTRACT OF THE DISCLOSURE

The present invention relates generally to improvements in the art of unloading and dispensing silage from silos, and relates more particularly to an improved silo unloading device of the type which acts on the silage from above to feed the same to a distributing zone from which it is picked up and conveyed to the exterior of the silo for use.

A primary object of the invention is to provide an improved low cost silo unloader which is extremely simple and compact in construction and which operates with a high degree of efficiency without need for expensive power transmisison mechanism and reduction gearing between the silage feeding auger and the pickup and distributing blower.

Background and prior art

Silo unloading devices of the type which are suspended within the silo and which operate on the material from above are in widespread use. One of the most popular devices of this type generally incorporates a rotating auger or screw type conveyor adapted to be driven circumferentially about the silo and thereby traverse the bed of silage to feed the same to a centrally located blower which picks up the silage as it is fed thereto and delivers the same through a discharge chute to the exterior of the silo through an opening in the silo wall. While these devices have proven quite satisfactory in operation and have been widely accepted by the trade, it has heretofore been deemed necessary for reasons of efficiency to drive the distributing blower at somewhat higher speeds than the feed auger, thus necessitating the use of expensive gearing and power transmission arrangements between the drive motor, feed auger and distributing blower. Such power transmissions not only add to the cost of the devices, but they are also subjected to relatively rough usage and require all too frequent repair and maintenance.

As shown in U.S. Patent No. 2,756,112, dated July 24, 1956, it has been heretofore suggested that an auger type conveyor could be coupled directly to the blower shaft and driven simultaneously therewith at the same speed. However, in the device of such patent, the auger is housed and operates within a trough or box-like structure to which the material is fed by a primary feeding conveyor of one type or another. Such structure is obviously costly and complicated, requiring a primary pickup and feed conveyor in addition to the auger along with separate power transmission gearing or the like for both the primary and secondary conveyors, and there is no suggestion whatsoever that the auger of this patented device could possibly operate satisfactorily directly on the silage bed without benefit of the primary feeder.

It has also been proposed, as shown in U.S. Patent No. 2,788,247, dated April 9, 1957, to utilize an endless chain type conveyor provided with scrapers and driven by means of a toothed ring carried by the outer extremities of the blower blades for feeding the material to the blower. However, such structure requires the use of a less efficient chain type feeder and a specially fabricated blower along with the gear ring carried thereby, and the silage furthermore cannot be delivered axially to the distributing blower for most effective operation.

Summary of the invention

It is therefore an important object of the present invention to provide an improved silo unloading device which obviates the aforesaid disadvantages and objections of prior known silo unloaders.

Another object of this invention is to provide an improved and greatly simplified silo unloader which embodies an auger type feeder adapted to traverse and act directly upon the stored silage to feed the same to a distributing blower driven simultaneously therewith and at the same speed by a common power source.

Still another object of the invention is to provide an improved silo unloading device which incorporates an auger feeder coupled directly to the shaft of a distributing blower for simultaneous high speed operation, thus eliminating the need for separate power transmissions.

These and other objects and advantages of the present invention will become apparent from the following detailed description.

The drawings

A clear conception of the various features constituting the present improvement, and of the construction and mode of operation of a typical silo unloader embodying the invention, may be had by referring to the drawing accompanying and forming a part of this specification wherein like reference characters designate the same or similar parts in the several views.

FIGURE 1 is a perspective view of a typical silo unloader embodying the present invention;

FIGURE 2 is a somewhat enlarged fragmentary view, in partial section, showing the common drive and coupling means for the feed auger and distributing blower; and FIGURE 3 is a similarly enlarged transverse section taken along the line 3—3 of FIGURE 2.

Detailed description

Referring to the drawing, the silo unloading device embodying the present invention and indicated generally by the reference numeral 5 is shown, in FIGURE 1, positioned within a silo 6 illustrated in phantom.

The silo unloader 5 includes an elongated frame 8 adapted for generally horizontal disposition within the silo 6 above the bed of silage stored therein. Mounted on the frame 8 is a power source, shown herein as an electric motor 9. Also mounted on the frame 8 adjacent to the motor 9 is a blower housing 12 having a side inlet opening 13 and upwardly directed discharge conduit 14. An elongated inverted U-shaped housing 16, also mounted on the frame 8, extends laterally from inlet 13 of the blower housing 12. Surrounding the upwardly extending discharge conduit 14 of the blower housing 12 is a collar 17 mounted to permit relative rotational movement between the collar and the blower.

The frame 8 is positioned within the silo 6 as by means of a bifurcated member 20 extending upwardly from the collar 17, and the member 20 has a cable 21 strung through suitable blocks or pulleys (not shown) at the top of the silo and centrally thereof. The collar 17 also has a stabilizing arm 23 radiating therefrom and provided at its outer end with a hook or clamp 24 secured to the silo wall at a side opening therein. The stabilizing arm 23 thereby cooperates with the member 20 and cable 21 to maintain the unloading device 5 in proper position within the silo with the blower housing 12 located approximately at the central vertical axis of the silo. Also mounted on the ring 17 and radiating outwardly and upwardly therefrom is a discharge chute or spout 26. A strut 27 supports and locates the spout 26 above the stabilizing arm 23, the strut 27 being connected between the arm 23 and the spout 26 to retain the same in position to discharge through the side wall opening of the silo.

A drive wheel 30 is mounted on the frame 8 by means of a bracket arm 31 and a power transmission rod or arm 32. The arm 32 is coupled through a suitable power transmission 33 or the like in a customary manner with the electric drive motor 9, and rotation of the arm 32 transmits power to the cleated drive wheel 30 to propel the silo unloader circumferentially about the vertical axis of the silo. One or more guide wheels 34 are carried by the outer free end of the inverted U-shaped housing 16 so as to rotate about a vertical axis in peripheral contact with the inner wall of the silo. The frame 8 may also be provided with an adjustable counterweight roller 35 or the like which can be used to properly balance the device on the bed of silage.

In accordance with the present invention, the drive shaft of the motor 9 has a sheave or sprocket 40 keyed thereto, and the sprocket 40 is drivingly coupled as by means of a belt or chain 41 to a sheave or sprocket 42 keyed to a shaft 43 extending axially through the blower housing 12. The shaft 43 is supported for rotation on the frame 8 as by means of a cross brace 45 secured to the frame and having a journal block 46 receiving the shaft 43. Keyed to the shaft 43 for rotation therewith and confined within the housing 12 is a blower 50 having radiating blades 51, and also keyed to the shaft 43 for simultaneous rotation is an auger type conveyor 53. As shown, the conveyor 53 extends outwardly from the blower inlet 13 under the inverted U-shaped hood or housing 16 toward the silo wall, and the conveyor 53 preferably carries a cutting wheel 54 at its outer end immediately adjacent the silo wall.

Thus, operation of the motor 9 drives the propelling wheel 30 through a suitable power transmission 33, 32 to cause the unloading device 5 to traverse the stored silage circumferentially about the vertical axis of the silo 6. At the same time, the motor 9 drives the shaft 43 at a relatively high rate of speed through the sheaves 40, 42 and belt 41 to thereby simultantously rotate both the blower 50 and the auger 53 at exactly the same speed. Such rotation of the auger 53, as the frame advances, causes the auger to act directly upon the silage to feed the same to the blower 50. The blower 50, in turn, delivers the silage through the spout 26 for distribution exteriorly of the silo.

From the foregoing detailed description, it is believed apparent that the present invention provides an extremely simple and compact silo unloader which eliminates expensive transmission gearing and the like between the blower and the auger conveyor or feeder. By directly coupling the auger feeder and the blower to a common drive shaft, it is unnecessary to provide separate drive means between the auger and the motor and the blower and the motor as was heretofore deemed necessary, and it is only necessary in the present instance to provide means for coupling the motor to the shaft which carries both the blower and the auger. The present device has, in fact, gone into extensive commercial use and has met with excellent acceptance due to its efficient performance and moderate cost. Additionally, the devices built in accordance with the present invention have required a minimum of maintenance and shut-down time. It has been found that rotation of the auger feeder 53 at the same high speed as the blower 50 has resulted in very efficient delivery of materials to the blower as well as effective distribution from the blower to the distributing spout and then exteriorly of the silo.

Various modes of carrying out the invention are contemplated as being within the scope of the following claims particularly pointing out and distinctly claiming the subject matter that is regarded as the invention.

I claim:
1. A silo unloading device comprising, a frame, means for propelling and guiding said frame circumferentially about the vertical axis of a silo above the silage stored therein, an auger type conveyor rotatably mounted on said frame for circumferential movement therewith in direct engagement with the stored silage, a housing mounted on said frame at one end of said auger conveyor, said housing having an inlet opening in axial alinement with said auger conveyor, a distributing spout extending from the periphery of said housing, a blower mounted for rotation within said housing in axial alinement with said auger conveyor, said blower and conveyor being mounted for rotation on a common shaft, and means for driving said shaft to simultaneously rotate said auger conveyor and said blower at the same speed to thereby cause said conveyor to feed silage to said blower and said blower to deliver the silage through said distributing spout as said frame is propelled and guided circumferentially about the silo.

2. A silo unloading device according to claim 1, wherein the auger conveyor is housed within an elongated inverted U-shaped cover of substantially constant dimensions throughout its length connected at one end to the blower housing adjacent the axially alined inlet opening thereof.

References Cited

UNITED STATES PATENTS

| | | | |
|---|---|---|---|
| 2,601,608 | 6/1952 | Hansen | 302—50 |
| 2,756,112 | 2/1956 | Knutson | 302—56 |
| 2,788,247 | 4/1957 | Chapman | 302—56 |
| 3,272,355 | 9/1966 | Loesch et al. | 214—17 |

ANDRES H. NIELSEN, *Primary Examiner.*